United States Patent [19]

Tekawa

[11] Patent Number: 5,798,047
[45] Date of Patent: Aug. 25, 1998

[54] PROCESS AND APPARATUS FOR ULTRAVIOLET DECOMPOSITION OF WASTE WATER CONTAINING ORGANIC SUBSTANCES

[75] Inventor: Masafumi Tekawa, Tokyo, Japan

[73] Assignee: NEC Corporation, Tokyo, Japan

[21] Appl. No.: 831,030

[22] Filed: Apr. 4, 1997

[30] Foreign Application Priority Data

Apr. 5, 1996 [JP] Japan ................. 8-110092

[51] Int. Cl.$^6$ ................. C02F 1/172; C02F 1/32
[52] U.S. Cl. ................. 210/739; 210/748; 210/759; 210/198.1; 210/205; 210/903; 210/908; 210/96.1
[58] Field of Search ................. 210/739, 748, 210/759, 908, 903, 916, 198.1, 205, 192, 96.1

[56] References Cited

U.S. PATENT DOCUMENTS 4,012,321  3/1977  Koubek ................. 210/748
5,439,599  8/1995  Gehin et al. ................. 210/748
5,470,480  11/1995  Gray et al. ................. 210/748

FOREIGN PATENT DOCUMENTS 62-262792  11/1987  Japan.
679266  3/1994  Japan.

OTHER PUBLICATIONS

Office Action in counterpart Japanese Application, issued Apr. 21, 1998 and English translation of portions within wavy lines.

*Primary Examiner*—Neil McCarthy
*Attorney, Agent, or Firm*—Sughrue, Mion, Zinn, Macpeak & Seas, PLLC

[57] ABSTRACT

In a process for UV decomposition of waste water containing organic substances as contaminants, the organic substances can be efficiently decomposed with maintaining a high decomposition rate by controlling addition of an oxidizing agent based on COD value of the waste water; for example, when the oxidizing agent is hydrogen peroxide, its concentration is continuously controlled within the range of 0.5 to 1.0 equivalents to the COD value.

3 Claims, 4 Drawing Sheets

- EAMPLE 1 (CONTROL OF THE AMOUNT OF THE OXIDIZING AGENT BASED ON THE COD)
- COMPARATIVE EXAMPLE 1 (CONTROL OF THE AMOUNT OF THE OXIDIZING AGENT BASED ON THE TOC)

PROCESS AND APPARATUS FOR ULTRAVIOLET DECOMPOSITION OF WASTE WATER CONTAINING ORGANIC SUBSTANCES

BACKGROUND OF THE INVENTION

1. Field of the Invention

This invention relates to an process and an apparatus for ultraviolet (UV) decomposition of waste water containing organic substances. In particular, this invention relates to a process and an apparatus for effectively decomposing organic substances as contaminants in waste water with maintaining a high decomposition rate in UV treatment of waste water containing organic substances comprising addition of an oxidizing agent to the waste water and then UV irradiation to decompose and remove the organic substances.

2. Description of the Related Art

In a treatment of waste water containing organic substances, processes for their decomposition have been important, which can be generally categorized into physico-chemical and biological processes.

Existing physico-chemical processes include those using an oxidizing agent such as potassium permanganate ($KMnO_4$), hydrogen peroxide ($H_2O_2$), chlorine ($Cl_2$), sodium hypochlorite (NaOCl) and ozone ($O_3$); electrolytic oxidation; and UV decomposition, which can be applied to waste water containing organic substances to reduce its COD (Chemical Oxygen Demand) value to below the predetermined value.

Meanwhile, biological processes, typically an activated sludge method, decompose organic substances by the use of microbial activities to agglomerate, adsorb, decompose and/or precipitate the dissolved organic substances and are potent processes for treatment of municipal subsurface water and organic waste water.

Among the above decomposition processes, a UV decomposition process comprises addition of an oxidizing agent to waste water and UV irradiation to decompose the organic substances finally into $CO_2$ and $H_2O$; specifically, in the case of waste water containing a sulfur- or nitrogen-containing compound, decomposition further proceeds to generate $H_2SO_4$ or $HNO_3$. The process is effective for those containing, for example, phenols or organo-chlorine compounds which are generally hard to be decomposed with any biological treatment.

UV is an electromagnetic wave with a shorter wavelength in the range of 100 to 400 nm, and the shorter the wavelength is, the higher its energy is. Light sources for UV irradiation include a low-pressure mercury lamp, a high-pressure mercury lamp, a xenon lamp and a hydrogen (deuterium) lamp, among which the low- and the high pressure mercury lamps are preferable for the above treatments because they have relatively high irradiance.

Oxidizing agents used for UV decomposition may include hydrogen peroxide, ozone, sodium hypochlorite and the like. Sodium hypochlorite is, however, not preferable because due to its association with increase of chlorine concentration, corrosion of apparatus, generation of organo-chlorine compounds or the like. Thus, hydrogen peroxide or ozone is generally used.

Furthermore, for ozone an ozone generator is expensive and its operating cost is high. Hydrogen peroxide whose investment cost is lower than that of ozone is, therefore, the most suitable.

A mechanism of UV decomposition involves a process that the oxidizing agent is excited mainly by UV energy to generate radicals and active oxygen, which then react with the organic substances. The process may also involve a synergism that the organic substances to be decomposed absorb the light to be excited and then induce a decomposition reaction.

In the above UV decomposition treatment of waste water, if the oxidizing agent is not adequately added, radicals and active oxygen are insufficiently generated by the UV irradiation. The decomposition reaction of the organic substances in the waste water is, thus, so late that the organic substances are not adequately treated and remain in the waste water.

On the other hand, excessive addition of the oxidizing agent reduces the decomposition rate of the organic substances because the radicals and active oxygen react with the oxidizing agent to disappear without reacting the organic substances. Furthermore, since most of the UV irradiated is absorbed by the oxidizing agent, the organic substances cannot be adequately irradiated to be excited, leading to reduction of the decomposition rate.

In addition, even when the oxidizing agent is initially added in an appropriate amount for a concentration of the organic substances in the waste water, the concentration of the oxidizing agent gradually reduces, leading to reduction of the rate of the decomposition in the course of the treatment process and the decomposition reaction is attenuated To solve the above problems, for example, JP-A-62/262792 suggests a process for treatment of waste waster containing organic substances, characterized in that the amount of an oxidizing agent added is controlled within the range of 1 to 5 equivalents to TOC (Total Organic Carbon) value of the waste water with the passage of time. However, depending on the kinds of the organic substances in the waste water, the amount of oxygen necessary for oxidative decomposition can vary for a given TOC value; specifically an oxygen-containing organic substance needs a smaller amount of oxidizing agent for their decomposition.

When controlling the amount of the oxidizing agent based on TOC value, therefore, the oxidizing agent may be added in excess, resulting in reduction of its decomposition efficiency.

Furthermore, when the waste water contains a sulfur- or nitrogen-containing compound, the oxidizing agent may not be adequate to oxidatively decompose the sulfur- or nitrogen-containing component into $H_2SO_4$ or $HNO_3$.

Thus, an optimal amount of the oxidizing agent cannot be always estimated from the TOC value of the waste water.

SUMMARY OF THE INVENTION

For resolving the above problems, an objective of this invention is to provide a process and an apparatus for effectively decomposing organic substances as contaminants in waste water with maintaining a high decomposition rate in its UV decomposition treatment.

To achieve the above objective, this invention provides a process for treatment of waste water containing organic substances comprising addition of an oxidizing agent to the waste water containing organic substances as contaminants and UV irradiation to decompose the organic substances, characterized in that addition of the oxidizing agent is controlled with the passage of time to maintain its proportion to the COD value of the waste water within a certain range.

In an embodiment of this invention, the oxidizing agent is hydrogen peroxide, whose amount is controlled to keep its concentration within 0.5 to 1.0, preferably 0.6 to 0.8 equivalents to the COD value of the waste water.

This invention can be applied to organic compounds including a sulfur- and nitrogen-containing organic compound such as dimethyl sulfoxide and monoethanolamine According to this invention, it is possible to avoid inadequate or excessive addition of an oxidizing agent in a UV decomposition process; to decompose organic substances in waste water consistently with an optimal amount of the oxidizing agent; and therefore, to effectively treat the waste water without reduction of the decomposition rate.

According to this invention, it is possible to conduct a UV decomposition treatment, avoiding insufficiency in the amount of an oxidizing agent necessary to oxidize sulfur- or nitrogen containing moieties in a sulfur- or nitrogen-containing compound into $H_2SO_4$ or $HNO_3$.

DETAILED DESCRIPTION OF THE PREFERRED EMBODIMENTS

The followings will describe embodiments of this invention.

The principle of this invention will be first described below.

In the present invention, it is possible to avoid insufficient or excessive addition of the oxidizing agent and to effectively conduct a treatment of the waste water by controlling the amount of the oxidizing agent with the passage of time within a certain range of proportion to COD value of the waste water.

Furthermore, while a conventional treatment controlling the amount of the oxidizing agent based on a TOC value of waste water has a problem that the amount of the oxidizing agent necessary for decomposition varies depending on kinds of the organic compounds to be treated, in this invention it is possible to effectively conduct the decomposition by controlling the amount of the oxidizing agent based on a COD value.

When hydrogen peroxide is selected as an oxidizing agent, its concentration is preferably controlled to be at 0.7 equivalents to the COD value of the waste water. Otherwise, a good result cannot be obtained. On the one hand, when the concentration of the peroxide concentration is less than 0.7 equivalents, the oxidizing agent is inadequate to fully accelerate the decomposition reaction, so that some of the organic substances remain untreated.

On the other hand, when the concentration is more than 0.7 equivalents, hydrogen peroxide absorbs a majority of UV and therefore the UV less effectively acts on the organic substances, resulting in reduction of the decomposition rate. In addition, since radicals and active oxygen generated by UV irradiation to hydrogen peroxide react with the existing hydrogen peroxide rather than the organic substances, hydrogen peroxide is wasted, leading to reduction of its efficiency.

It is, therefore, preferable to control the concentration at 0.7 equivalents to the COD value, for effective treatment of the waste water. However, in an operation of the process, it may be sometimes difficult to control the concentration at 0.7 equivalents to the COD value. Thus, the concentration of hydrogen peroxide is practically controlled within the range of 0.5 to 0.9, preferably 0.6 to 0.8 equivalents to the COD value, where the waste water can be treated without significant reduction of decomposition efficiency.

Furthermore, when the waste water contains, as a contaminant, a sulfur- or nitrogen-containing organic compound, according to this invention, the UV decomposition can be conducted without insufficiency of the oxidizing agent, not considering the amount of the oxidizing agent, and oxidize the sulfur- or nitrogen containing component into $H_2SO_4$ or $HNO_3$, which makes the situation complex in a process controlling the amount of oxidizing agent based on TOC value.

Figure 1:
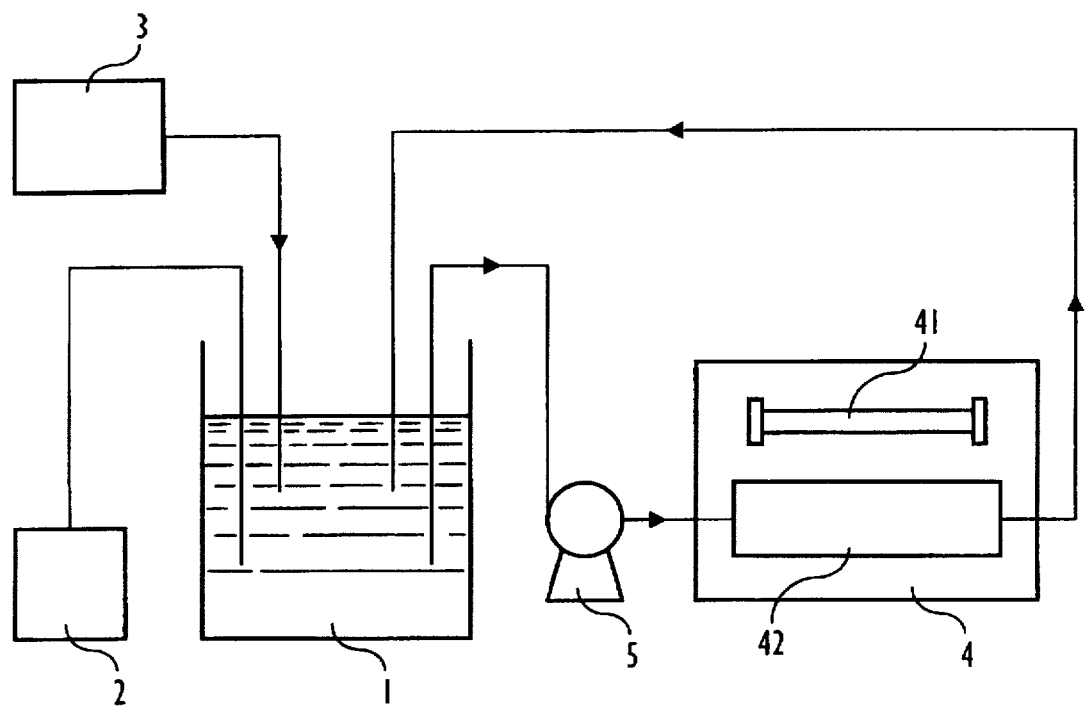
FIG. 1 shows an embodiment of the configuration of the UV decomposition system for waste water containing organic substances according to this invention.

FIG. 1 shows an embodiment of the configuration of the UV decomposition system for waste water containing organic substances according to this invention.

Referring to FIG. 1, the embodiment of this invention will be described. The system has a configuration essentially consisting of fluid 1 to be treated, i.e., waste water containing organic substances; a COD measuring device 2 which measures the concentration of the organic substances in the fluid 1; a tank 3 for addition of an oxidizing agent to the fluid 1; a UV decomposition apparatus 4 for decomposing and removing the organic substances by UV irradiation to the fluid 1; and a feed pump 5 which feeds the fluid 1 to the apparatus 4 and circulates it.

The UV decomposition apparatus 4 is equipped with a mercury lamp 41 as a light source for UV irradiation and a reactor 42 in which the UV decomposition reaction occurs.

According to this invention, during decomposition of the fluid 1 by the apparatus 4, the concentration of the organic substances in the fluid 1 is measured with the device 2 and based on the measurement, an optimal amount of the oxidizing agent is added from the tank 3 to the fluid 1 to efficiently conduct a UV decomposition reaction consistently in the presence of the optimal amount of the oxidizing agent.

Figure 2:
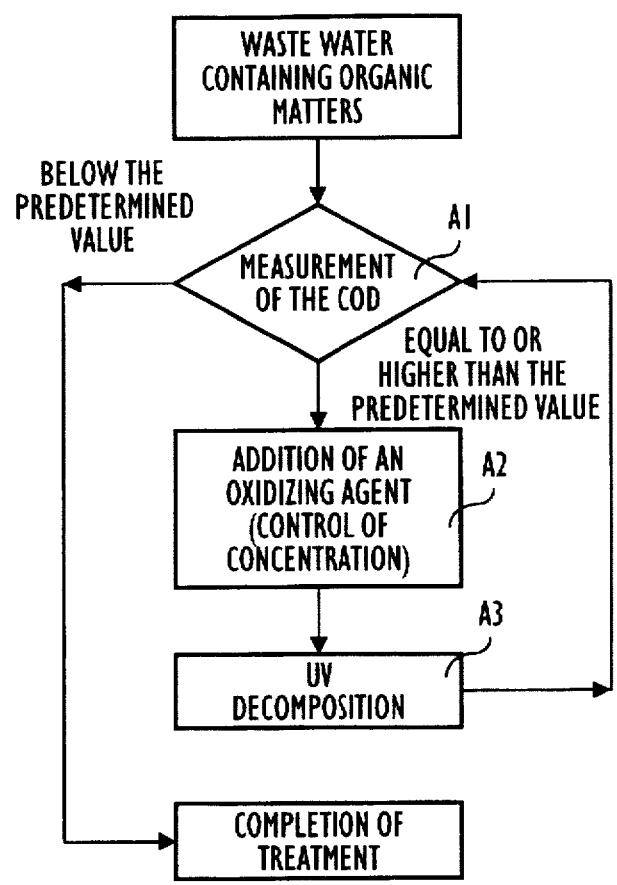
FIG. 2 is a flowchart illustrating a treatment procedure in an embodiment of the UV decomposition process for waste water containing organic substances according to this invention, in which the concentration of the oxidizing agent is controlled based on a COD value.

Referring to FIG. 2, an embodiment of the treatment operation according to this invention will be described. FIG. 2 is a flow chart showing an operation of an embodiment of the process according to this invention where UV decomposition is conducted, controlling the concentration of the oxidizing agent to be constant in its proportion to the COD value.

Referring to FIG. 2, a COD of the fluid to be treated, i.e., the waste water containing organic substances, is measured in Step A1. If the COD value is below the predetermined value, then the treatment is terminated, while if it is equal to or higher than the predetermined value, an oxidizing agent is added in an appropriate amount to the COD value in Step A2 to control its concentration and then the waste water is subject to UV decomposition in Step A3.

The above Steps A1 to A3 are repeated, regularly measuring the COD value until a COD value below the predetermined value is obtained; thus the UV decomposition is effectively conducted with an optimal concentration of the oxidizing agent.

EXAMPLE 1

Referring to the drawings, an embodiment of this invention will be more specifically described by means of this example. The process of this example consists of determination of an optimal amount of an oxidizing agent added, and decomposition treatment of the waste water, controlling addition of the oxidizing agent.

First, the step of determination of an optimal amount of the oxidizing agent added will be described.

In this example, fluid to be treated was waste water containing dimethyl sulfoxide, $CH_3SOCH_3$, and monoethanolamine, $H_2NCH_2CH_2OH$. A UV decomposition apparatus 4 was one having a 110 W low-pressure mercury lamp 41 as a light source for UV irradiation and a 80 ml quartz cell as a reactor 42.

Aqueous hydrogen peroxide was added to the fluid having one of three concentrations of the organic substances whose COD value was 8000 mg/l, 5000 mg/l or 1000 mg/l. The fluid was fed into the quartz reactor 42 in the UV decomposition apparatus 4, and then was subject to a photo reaction for 10 min. by means of irradiation with mainly 254 nm of UV from the low-pressure mercury lamp 41.

Figure 3A:
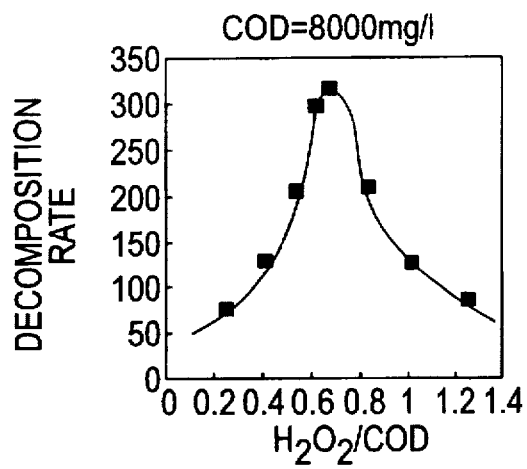
FIG. 3 shows graphs for Example 1, in which each graph shows a relationship between the amount of hydrogen peroxide and decomposition rate at different concentrations of organic substances.
Figure 3B:
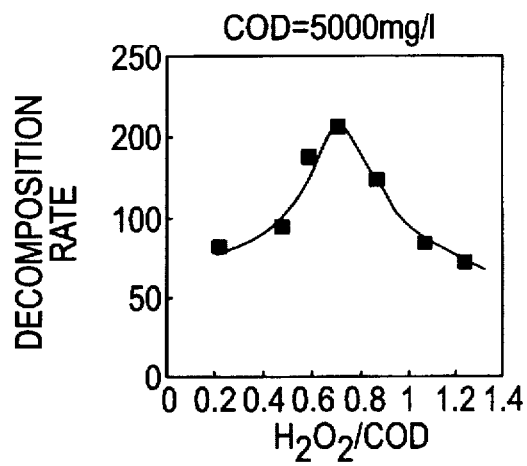
Figure 3C:
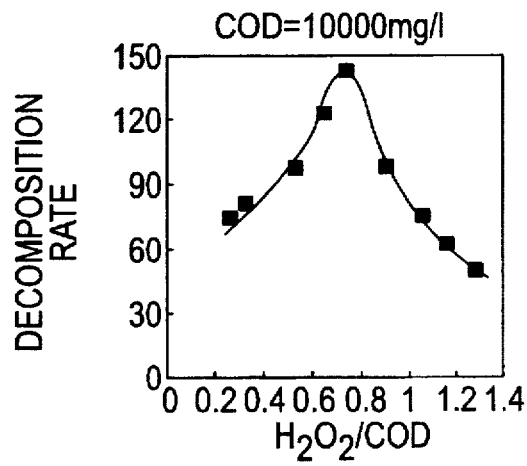

FIG. 3 shows the decomposition rates of the UV treatment for the different amounts of hydrogen peroxide added, wherein an added amount of hydrogen peroxide is expressed by a ratio of the concentration of hydrogen peroxide to COD ($H_2O_2$/COD) in the fluid to be treated (abscissa) and a decomposition rate is expressed variation of the COD value in the waste water after 10 min. UV decomposition treatment (ordinate).

As shown in FIG. 3, in all the COD values, the decomposition rate was maximum when hydrogen peroxide was added in the amount corresponding to 0.7 equivalents to the COD value. It can be concluded that the optimal amount of hydrogen peroxide is 0.7 equivalents to the COD value.

Secondly, the step of decomposition of the waste water containing organic substances, controlling the amount of the oxidizing agent will be described.

Hydrogen peroxide was added to the waste water containing dimethyl sulfoxide and monoethanolamine whose COD value was 8400 mg/l, the concentration of hydrogen peroxide was adjusted to 5400 mg/l, about 0.7 equivalents to the COD value, and the water was fed to the quartz reactor 42 in the UV decomposition apparatus 4 and circulated by the feed pump 5.

Then, UV was irradiated by the 110 W low-pressure mercury lamp 41 to initiate a UV decomposition reaction. During the UV decomposition treatment, regularly measuring the COD value, hydrogen peroxide was added to keep its concentration within 0.7±0.2 equivalents to the COD value.

As a result, the organic substances in the waste water were gradually decomposed by the UV irradiation. Finally, the organic substances were completely decomposed to generate $CO_2$, $H_2O$, $H_2SO_4$ and $HNO_3$.

Figure 4:
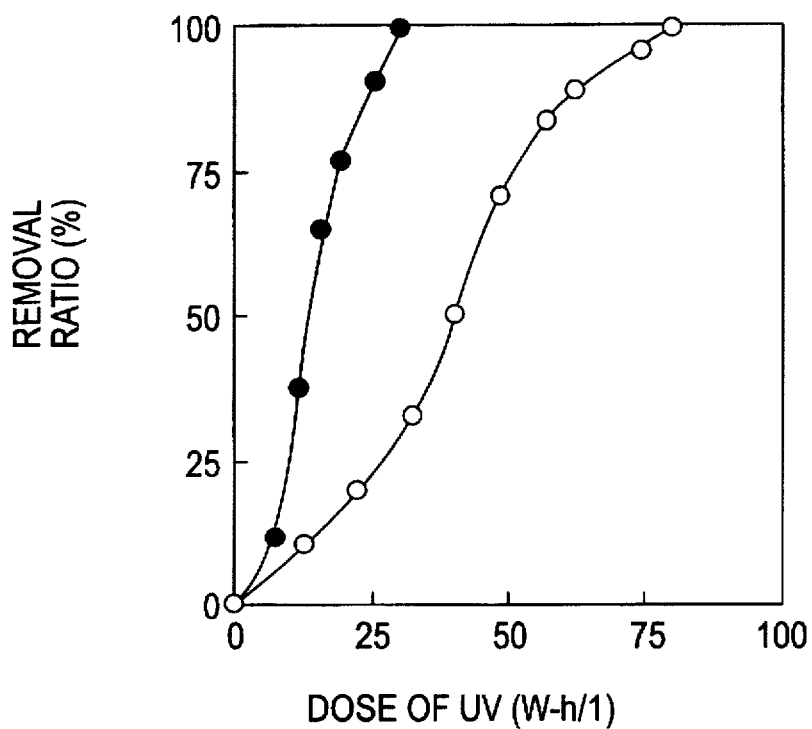
FIG. 4 is a graph illustrating Example 1 in comparison with Comparative Example 1, which shows removal ratios of the organic substances in the conditions of Example 1 and Comparative Example 1.

FIG. 4 shows the relationship the dose of UV and the removal ratio of the organic substances in the fluid to be treated.

As shown in FIG. 4, the dose of UV was 30 W-hr/l at the completion of the decomposition treatment.

Comparative Example 1

In a similar manner to Example 1, hydrogen peroxide was added to a waste water containing dimethyl sulfoxide and monoethanolamine whose COD value was 8400 mg/l and TOC value was 1750 mg/l, an initial concentration of hydrogen peroxide was adjusted to 5400 mg/l, and a photo reaction was initiated. The initial concentration of hydrogen peroxide was 3.0 equivalents to the TOC value. Therefore, during the UV decomposition treatment, regularly measuring the TOC value, hydrogen peroxide was added to keep its concentration at 3.5 equivalents to the TOC value.

As shown in FIG. 4 (Comparative Example; open circle), the concentration of the organic substances was gradually reduced by the UV irradiation, and finally the organic substances were completely decomposed and removed. The dose of UV was 80 W-hr/l at the completion of the decomposition treatment.

What is claimed is:

1. A process for ultraviolet treatment of waste water containing organic substances comprising addition of an oxidizing agent comprising hydrogen peroxide to the waste water containing organic substances and ultraviolet-ray irradiation to decompose the organic substances, wherein addition of the hydrogen peroxide is controlled with the passage of time to maintain its proportion to the COD value of the waste water within the range of from 0.6 to 0.8 equivalents to the COD value of the waste water.

2. A process according to claim 1, wherein the waste water contains, as a contaminant, a sulfur- or nitrogen-containing organic compound.

3. An apparatus for ultraviolet treatment of waste water containing organic substances, comprising a monitoring means for a COD value of the waste water;

a means for addition of an oxidizing agent to the waste water, said oxidizing agent comprising hydrogen peroxide;

an ultraviolet-decomposition means to decompose and remove the organic substances in the waste water by irradiating ultraviolet rays to the waste water; and a feeding means to feed the waste water to the said ultraviolet-decomposition means and circulate it; and a means for controlling addition of the hydrogen peroxide to maintain its proportion to the COD value of the said water within the range of from 0.6 to 0.8 equivalents to the COD value of the waste water.

* * * * *